(12) United States Patent
Tripathi et al.

(10) Patent No.: US 8,624,437 B2
(45) Date of Patent: Jan. 7, 2014

(54) POWER CONVERSION SYSTEM AND METHOD

(75) Inventors: Anshuman Tripathi, Singapore (SG); Gil Lampong Opina, Jr., Singapore (SG); Amit Kumar Gupta, Singapore (SG); Yugarajan Karuppanan, Singapore (SG); Zhi Yoong Ang, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 403 days.

(21) Appl. No.: 12/979,909

(22) Filed: Dec. 28, 2010

(65) Prior Publication Data

US 2011/0148198 A1 Jun. 23, 2011

(51) Int. Cl.
*H02J 1/00* (2006.01)

(52) U.S. Cl.
USPC .......................................................... 307/80

(58) Field of Classification Search
USPC .......................................................... 307/80
See application file for complete search history.

(56) References Cited

U.S. PATENT DOCUMENTS

| | | | |
|---|---|---|---|
| 6,946,750 B2 | 9/2005 | Wobben | |
| 7,339,355 B2 | 3/2008 | Erdman et al. | |
| 7,439,714 B2 | 10/2008 | Llorente Gonzalez et al. | |
| 7,608,937 B1 | 10/2009 | Altenschulte | |
| 2004/0100102 A1 | 5/2004 | Wobben | |
| 2007/0164567 A1* | 7/2007 | Luetze et al. | 290/44 |
| 2009/0001725 A1 | 1/2009 | Llorente Gonzalez et al. | |
| 2010/0025995 A1* | 2/2010 | Lang et al. | 290/44 |
| 2010/0060000 A1* | 3/2010 | Scholte-Wassink | 290/44 |
| 2012/0155125 A1* | 6/2012 | Zhang et al. | 363/34 |

FOREIGN PATENT DOCUMENTS

| | | |
|---|---|---|
| EP | 1798837 A2 | 6/2007 |
| EP | 2056424 A2 | 5/2009 |
| EP | 2169800 A2 | 3/2010 |
| WO | 2006/107548 A1 | 10/2006 |

* cited by examiner

*Primary Examiner* — Jared Fureman
*Assistant Examiner* — Duc M Pham
(74) *Attorney, Agent, or Firm* — Patterson & Sheridan, LLP

(57) ABSTRACT

A power conversion system for converting electrical power from at least one power source includes a plurality of converter chains which couple the at least one power source to at least one load. At least two of the converter chains comprise an associated dissipating unit. The dissipating units are coupled via at least one switch. A controller is arranged to control the at least one switch to route power to be dissipated from one of the converter chains to the converter chain's associated dissipating unit, or to at least one of the other dissipating units, or to the converter chain's associated dissipating unit and to at least one of the other dissipating units, to cause corresponding dissipation of the power to be dissipated.

15 Claims, 11 Drawing Sheets

POWER CONVERSION SYSTEM AND METHOD

TECHNICAL FIELD

The invention generally relates to a system for converting electrical power and to a method of converting electrical power. For example, the system and method are capable of converting electrical power from a wind turbine generator and providing the converted power to the mains power supply.

BACKGROUND

US 2009/0001725 A1 describes a converter system with a plurality of converter modules capable of converting electric power produced by a generator into electric power applicable to a utility grid. The converter modules comprise generator AC/DC converters, DC-links with DC-link capacitors and grid DC/AC converters and may be enabled or disabled in response to a parameter related to the variable amount of electric power produced by the generator. Brake choppers for dissipation of residual power may be coupled in parallel to the DC-link capacitors.

US 2004/0100102 A1 relates to a wind power installation with multiple independent power generating systems arranged in parallel, but switchably interconnected to allow continued operation in the event of a critical component failure.

SUMMARY

A first aspect of the invention relates to a power conversion system for converting electrical power from at least one power source. The system comprises a plurality of converter chains which couple the at least one power source to at least one load. At least two of the converter chains comprise an associated dissipating unit. The dissipating units are coupled via at least one switch. A controller is arranged to control the at least one switch to route power to be dissipated from one of the converter chains to the converter chain's associated dissipating unit, or to at least one of the other dissipating units, or to the converter chain's associated dissipating unit and to at least one of the other dissipating units, to cause corresponding dissipation of the power to be dissipated.

A second aspect of the invention concerns a method of converting electrical power which comprises routing electrical power from at least one power source to at least one load via a plurality of converter chains. At least two of the converter chains comprise an associated dissipating unit. The dissipating units are coupled via at least one switch. By controlling the at least one switch, power to be dissipated from one of the converter chains is routed to the converter chain's associated dissipating unit, or to at least one of the other dissipating units, or to the converter chain's associated dissipating unit and to at least one of the other dissipating units, to cause corresponding dissipation of the power to be dissipated.

BRIEF DESCRIPTION OF THE DRAWINGS

In the following description, the invention will be explained in more detail with reference to the implementation examples shown in the drawings, in which.

DETAILED DESCRIPTION

Figure 1:
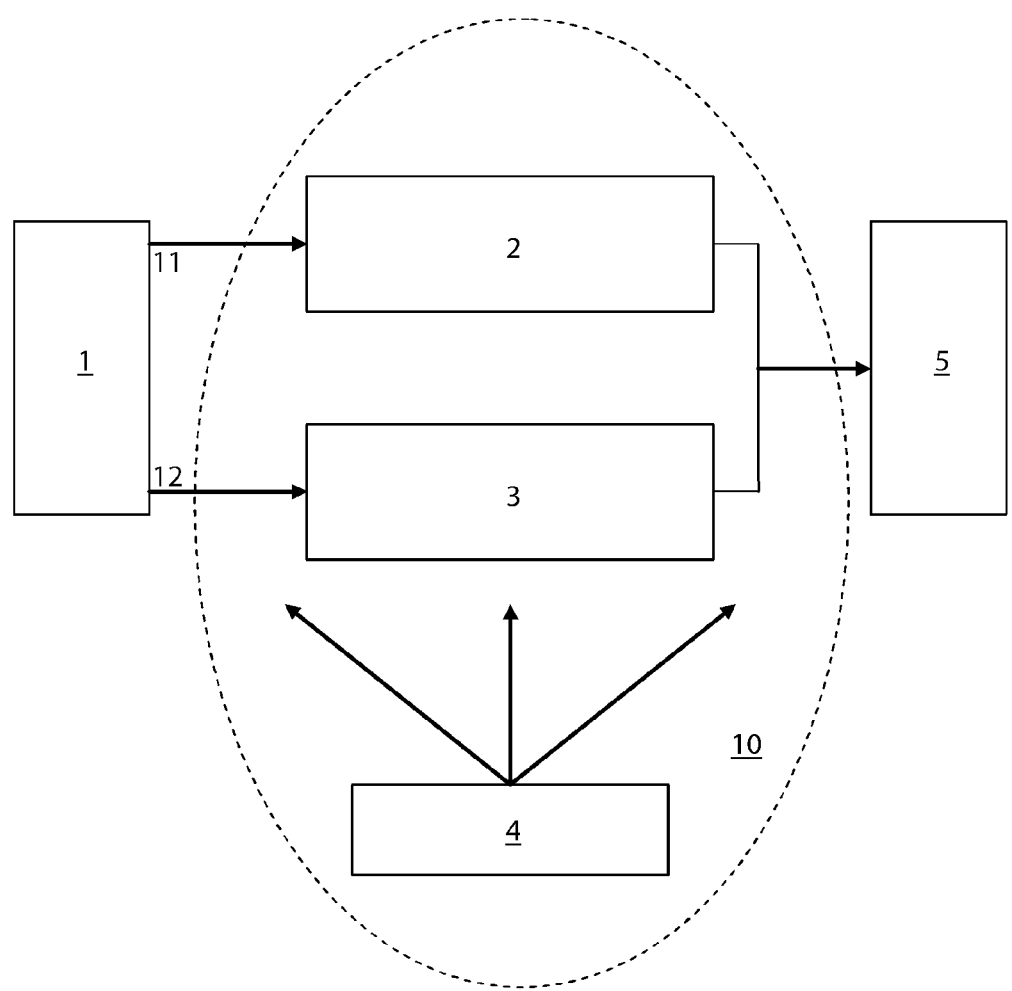
FIG. 1 is a diagrammatic overview of an example of the power conversion system.

The invention relates to a power conversion system for converting electrical power from at least one power source.

For example, this at least one power source may be a wind turbine generator providing electrical AC power; or a plurality of wind turbine generators may provide power to the power conversion system as a plurality of power sources. Alternatively, a wind turbine generator may be divided in a plurality of generator segments, which produce a plurality of independent AC power outputs and thus represent separate power sources. Segmented generators increase the reliability of a generator, since generator fault events mostly concern single generator segments only, so that the other segments may continue to operate.

The power conversion system couples the at least one power source to at least one load, for example the mains power supply network. Thus, the power conversion system may in one example convert electrical AC power from a wind turbine generator in AC power adapted to the requirements of the main power supply network and supply the converted AC power to the mains power supply network. Other components, such as one or more transformers, may be coupled between the power conversion system and the load. In another example, the power conversion system may couple the power from the at least one power source to a plurality of loads, for example a plurality of supply networks.

Further, the power conversion system comprises a plurality of converter chains which may provide different power transfer paths from the at least one power source to the at least one load. In one example, e.g. if the converter chains couple a single power source to a common load, the converter chains may be electrically connected in parallel. In other examples, the converter chains may not be connected at their inputs or their outputs or both, e.g. if the converter chains are coupled to different power sources or different loads or both. If galvanic coupling is provided only at one side of the converter chains or not at all, cross current flow from one converter chain to the other may be avoided or at least limited.

Providing a plurality of converter chains to couple the at least one power source to the at least one load allows the distribution of current produced by the at least one power source to the plurality of converter chains, with the result that lower currents flow through the individual converter chains. Furthermore, implementations with a plurality of converter chains may enhance the reliability of the power conversion system and provide redundancy. For example, each converter chain may comprise controllable switches to isolate, and thus deactivate, components of individual converter chains from the at least one power source and the at least one load. In addition, the converter chains may be coupled via controllable switches to allow the bypassing of deactivated converter chain components. Thus, in some examples it may be possible to distribute all or part of the power otherwise routed through the deactivated converter component to one or more components of the other converter chains. In other implementations which connect the converter chains to dedicated power sources, e.g. dedicated generator segments, the system may continue to operate with reduced power output if one of the converter chains is deactivated.

According to one implementation example, a converter chain may comprise a source-side AC/DC converter and a load-side DC/AC converter coupled in series. Between the AC/DC converter and the DC/AC converter, DC-links may in one example provide DC coupling. In the following, the expression "source side" denotes that a component is closer to the source than a reference component, which is the DC-link or, if there is no DC-link, a point between the two converters of a converter chain, if not stated otherwise; and the expression "load side" denotes that a component is closer to the load than the reference component.

At least two of the DC-links may in one example be coupled via one or more switches. This may enable converter chain components to be bypassed, e.g. the load-side DC/AC converter (cp. above), and connecting the DC-links may improve DC-link voltage balance of the converter chains.

In addition, the converter chains may comprise controllable switches to isolate both the source-side AC/DC converter and the load-side DC/AC converter of one or more of the converter chains from the at least one power source and the at least one load.

At least two of the converter chains comprise an associated dissipating unit. An associated dissipating unit may be coupled to the corresponding associated converter chain via one or more switches, for example switches controllable by the controller or electronic devices which automatically provide for a connection under certain predetermined conditions (e.g. diodes which are turned on at a predetermined voltage drop). Alternatively, in particular if the start of power dissipation may be controlled and is not initiated automatically as soon as power is input to the dissipating unit, the associated dissipating unit may be coupled to the converter chain without using switches. Other dissipating units not associated with the converter chain may in one example be coupled to that converter chain only indirectly via further components, in particular via another dissipating unit, so that power from the converter chain may be routed to other dissipating units only via these further components. In some examples, routing power from a converter chain to a dissipating unit which is not the associated dissipating unit requires the control (or closure) of at least one more controllable switch than when routing power from the converter chain to its associated dissipating unit. In one example, power to be dissipated may be routed from a converter chain to the associated dissipating unit by default and to other dissipating units only under special circumstances.

Each dissipating unit may comprise one or more dissipating elements which are able to convert electrical power to be dissipated into heat or into a different form of energy, for example one or more resistors. Herein, the expression "power to be dissipated" refers to power present in a converter chain which cannot be handled properly by the converter chain or one or more components of the converter chain due to a fault event of any kind. For example, it may be power which is input to a converter chain from the at least one power source but cannot be converted due to a converter fault; or excess power input to a converter chain, because a wind turbine connected to a wind turbine generator representing the at least one power source goes into overdrive; or residual energy in the DC-link after deactivation of a converter chain. Dissipating such power may protect electronic components of the converter chains and thus prolong their life cycle.

Dissipating power by means of the one or more dissipating elements may be controlled by a controller. For example, controllable switches coupled to the one or more dissipating elements may enable dissipation to be started and stopped in a controlled manner, and/or the amount of dissipated power may be controlled e.g. by means of PWM control of corresponding switches.

According to the invention, the at least two dissipating units are coupled via at least one switch controllable by a controller. On the one hand, this enables distributing power to be dissipated to at least two dissipating units, thus allowing the dissipation of larger amounts of power without providing larger dissipating units and protecting the separate dissipating units from overload or wear e.g. during long duration fault events. On the other hand, the dissipating units may be coupled to enable a (e.g. faulty) dissipating unit to be bypassed in one example, thus providing redundancy.

Implementations of the power conversion system comprising more than two converter chains with associated dissipating units may e.g. couple all of the dissipating units via controllable switches. Alternatively, the dissipating units may be distributed in different groups of at least two dissipating units, and only dissipating units of a group may be connected to each other via controllable switches. The higher the number of coupled dissipating units is, the larger are the amounts of power and the longer are the fault events that can be handled and the greater is the redundancy that may be provided. The optimum number of coupled dissipating units depends on the application and the involved amounts of power to be dissipated.

The dissipating units may in some examples be coupled to their spatially adjacent dissipating units via lines which are interrupted by the controllable switches, i.e. coupled in series. For such implementations a ring line interrupted by the controllable switches may be used which also couples the dissipating units arranged in spatially outermost positions.

In other implementations, the dissipating units may be coupled in configurations with enhanced fail-safety which enable the connection of any two dissipating units without involving spatially interjacent dissipating units. Such configurations may couple the dissipating units via the controllable switches to a common connection point, e.g. a common line. Examples are star configurations or bus bars. In another example, each dissipating unit may be coupled to a plurality of other dissipating units by lines interrupted by controllable switches.

As already explained, the dissipating units may be coupled to their associated converter chains e.g. via switches. In some examples, the dissipating units are coupled to a point at the input of their associated converter chains where the input power received by the converter chain from the at least one power source, which is to be converted, can be tapped and routed to the associated dissipating unit before it enters other components of the converter chain (in particular the converters). If the input power is a multi-phase AC power provided by multiple phase lines, the dissipating units may comprise a number of dissipating elements (e.g. resistors) which is equal to the number of phases (phase lines) of the input power. In the event that the multi-phase AC input power is to be dissipated, each dissipating element may be coupled to a respective phase line. In other examples, the dissipating unit may comprise an AC/DC converter, e.g. a diode bridge rectifier, to convert the AC power into DC power; the DC power may then be dissipated by a single dissipating element.

Additionally or alternatively, the dissipating units may in one example be coupled to a point between the source-side and load-side converters of their associated converter chains, e.g. across the DC-links (if provided), to enable power present between the converters or in the DC-links to be routed to the dissipating units.

Other points may be chosen for coupling the associated dissipating units to their respective converter chains.

The power conversion system also comprises a controller which is arranged to route the power from the at least one power source to the at least one load via the plurality of converter chains. In addition, the controller is arranged to route power to be dissipated from one of the converter chains to its associated dissipating unit; or to at least one of the other dissipating units; or to its associated dissipating unit and to at least one of the other dissipating units by controlling the one or more controllable switches coupling the dissipating units to cause corresponding dissipation of the power to be dissipated.

For example, the controller may comprise one or more microcontrollers, or it may be a software routine. Other configurations are possible.

In one implementation, the controller may monitor one or more parameters indicative of the presence of power to be dissipated in one or more of the converter chains. For example, the one or more parameters may be one or more of the following: the voltage between the converter terminals or across the DC-link of the converter chains; the current at the converter terminals or in the DC-link of the converter chains; the power output from the at least one power source; the current output from the at least one power source; the voltage output from the at least one power source; the voltage of the load; and the frequency of the load. Based on these one or more parameters, the controller may detect the presence of power to be dissipated in one or more converter chains, and in one implementation example it may also detect and identify one or more of a plurality of possible fault events. For example, such fault events comprise source fault events, such as one-phase, two-phase or three-phase short-circuits, load fault events, such as low voltage, high voltage and zero voltage, and converter fault events, such as failure of converter components. In some examples, the controller may derive and detect the presence of power to be dissipated in a converter chain from and based on the detection and identification of a fault event, or vice versa.

If the presence of power to be dissipated in a converter chain is detected, the controller may in one example trigger the routing of the power to be dissipated to one or more dissipating units by controlling one or more corresponding controllable switches.

In one implementation, the controller may route the power to be dissipated to the dissipating unit associated with the corresponding converter chain by default. The controller may also decide e.g. based on the detected fault event whether the converter chain input power or the power between the converters, or in the DC-links, is to be routed to the associated dissipating unit. In particular, if a fault event concerning the at least one power source or a converter chain component arranged on the source side of a point between the converters or of the DC-link occurs, the controller may route the converter chain's input power to the dissipating unit; and if a fault event concerning the load or a converter chain component on the load-side of a point between the converters or of the DC-link occurs, the controller may route the power between the converters or in the DC-link to the associated dissipating unit.

In one implementation, the controller will route the power to be dissipated not to the associated dissipating unit, but to one or more other dissipating units e.g. if the associated dissipating unit is unavailable due to a fault (e.g. due to overheating), or restrictedly available e.g. because it may already be dissipating power due to another fault event. Of course, the controller may also consider the availability of the other dissipating units for this decision.

In addition, the controller may route the power to be dissipated from one of the converter chains to more than one dissipating unit (either to the associated dissipating unit and at least one other dissipating unit, or to at least two other dissipating units, depending e.g. on the associated dissipating unit's availability) e.g. when dissipating the power to be dissipated in a single dissipating unit would risk overloading or wearing out that single dissipating unit. Such a risk may occur, for example, if a large amount of power to be dissipated (an amount of power e.g. exceeding a power threshold) is present or expected due to the nature of the current fault event; or if there is a fault event of long duration (a fault event e.g. longer than a predetermined time interval).

In addition, the controller may control dissipation in the dissipation units, in particular starting and stopping dissipation. For example by means of PWM control of one or more corresponding switches, the amount of power dissipated by the dissipating element(s) in a certain time interval may additionally be controlled.

The controller may also isolate and/or bypass converter chain components based on a detected fault event by controlling corresponding switches.

The method of converting power is in one example concerned with the above-described steps which are carried out and initiated by the controller.

The implementation examples shown in the drawings will be explained in more detail below.

FIG. 1 is a diagrammatic overview of an example of the power conversion system. As can be seen, the power conversion system 10 couples a wind turbine generator 1 to the mains power supply 5, which represents a load. The wind turbine generator 1 provides first and second independent AC power outputs 11 and 12 and thus provides two power sources. Neither the wind turbine generator 1 nor the mains power supply 5 are part of the power conversion system 10.

As illustrated, the power conversion system 10 comprises two converter chains 2 and 3 and a controller 4. Converter chain 2 receives the first AC power output as its input and converts it to a power adapted to be supplied to the mains power supply 5. Converter chain 3 receives the second AC power output as its input and converts it to a power adapted to be supplied to the mains power supply 5. The powers output by converter chains 2 and 3 are added to one another. The result of the addition represents the output of the power conversion system 10, which is supplied to the mains power supply 5. In most cases, one or more transformers (not shown) are provided either as part of the power conversion system 10 or between the power conversion system 10 and the mains power supply 5. The power conversion system 10 may comprise further components.

The controller 4 is arranged to route power from the power sources 11 and 12 to the mains power supply 5 via the converter chains 2 and 3. Further details of the functionality of the controller 4 will be described with reference to the following figures.

Figure 2:
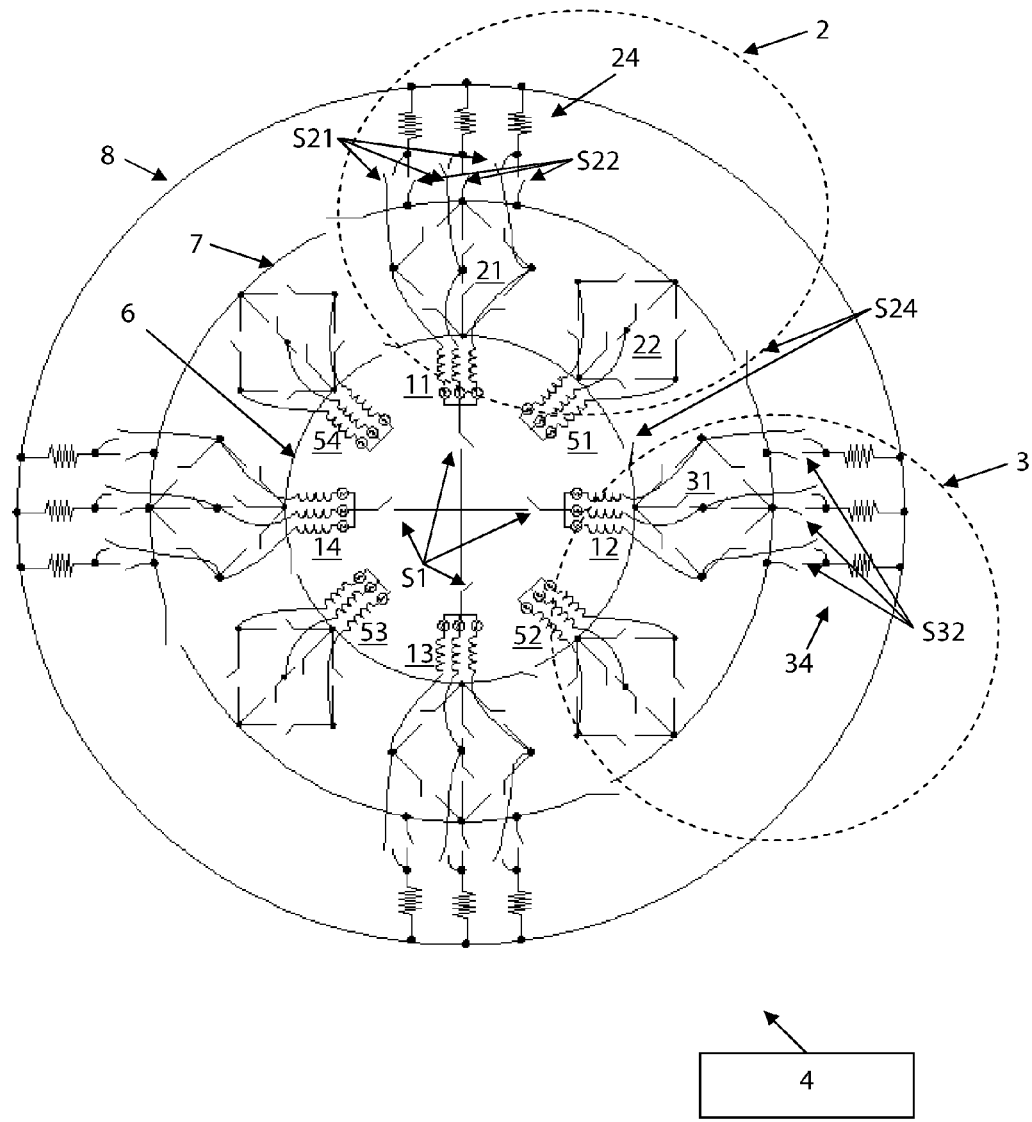
FIG. 2 shows a schematic illustration of another example of the power conversion system.

FIG. 2 shows a schematic depiction of another example of a power conversion system. It is to be noted that the circular arrangement has been chosen for illustration purposes only. In practice it is unlikely that a power conversion system will be arranged in this manner.

The power conversion system of FIG. 2 couples four three-phase power sources 11-14 to four loads 51-54. Power sources 11-14 may represent four generator segments—e.g. magnetically and electrically isolated winding sets—of a wind turbine generator, which each produces its respective three-phase AC power output. Such generator segments are often arranged in symmetrical pairs (e.g. in pairs of winding sets axially symmetrically distributed over the stator). This also applies to the example of FIG. 2: Power sources 11 and 13 form a symmetrical pair of winding sets, and power sources 12 and 14 form a symmetrical pair of winding sets. The power sources 11-14 may be coupled at their neutral points via controllable switches S1. For example, a controller 4 may control the switches S1 to couple the power sources 11-14. Generator segments should only be coupled if they are symmetrically designed in order to avoid power circulation between the coupled generator segments.

The controllable switches S1 as well as all other controllable switches mentioned above and below may be any device which allows the controlled breaking and making of a connection depending on control signals from a controller. For example, the switches may be breakers, contactors with or without a fuse, semiconductor power switches, e.g. insulated-gate bipolar transistors, metal oxide semiconductor field-effect transistors (MOSFETs), IGBT transistors, gate turn-off (GTO) thyristors, anti-parallel thyristors or controllable diodes. A controllable switch may comprise one or more switches. For example, a controllable switch in a three-phase line may comprise three switches, one for each phase line. In another example, a controllable switch comprises redundant switches, e.g. two parallel switches, which allow the selective making and breaking of the corresponding connection even if one of the switches is damaged. Herein, the expression "closing" a switch designates controlling the switch to make a connection; the expression "opening" a switch designates controlling the switch to break a connection.

Back to FIG. 2, the power conversion system comprises four identical converter chains. For the sake of clarity, reference signs have only been added to a part of the depicted components of the power conversion system, namely to converter chain 2 and partly to converter chain 3. The following explanations regarding the components referenced by reference signs apply to corresponding components without reference signs in analogy.

Converter chain 2 is one of the four converter chains and couples power source 11 to load 51. It comprises a source-side AC/DC converter 21 connected to the power source 11, which converts AC power received from power source 11 into DC power. AC/DC converter 21 (as all other converters) is generically illustrated by six switches. Furthermore, converter chain 2 comprises a DC-link, which is represented in FIG. 2 as a segment of the circle lines 6 and 7; circle line 7 is usually on ground potential. The respective segments of circle lines 6 and 7 forming the DC-links of the individual converter chains can be connected and separated by means of controllable switches (one of which is switch S24).

In general, the DC-link may comprise a capacitive energy storage (e.g. a capacitor), or—especially when only low currents occur—an inductive energy storage (e.g. an inductor). In the example of FIG. 2 a capacitor is provided (though not shown).

Again with reference to FIG. 2, coupled to the DC-link 6, 7 is a load-side DC/AC converter 22, which converts DC power received via the DC-link into AC power adapted to requirements of load 51 and couples it to the load 51. Such requirements of load 51 may concern the frequency, voltage or other properties of the power signal. Operation of the AC/DC converter 21 and the DC/AC converter 22 may be controlled by controller 4 or another controller.

In addition, converter chain 2 comprises an associated dissipating unit 24, which is coupled via controllable switches S21 to the input of the converter chain at the source side of the AC/DC converter 21 and via controllable switches S22 to the DC-link. Controller 4 is arranged to control switches S21 to route power received at the input of the converter chain to dissipating unit 24 and to control switches S22 to route power present in the DC-link to dissipating unit 24.

As can be seen, dissipating unit 24 comprises three dissipating elements coupled to ground potential 8, and controllable switch S21 comprises three switches. This configuration enables the selective connection of the separate phases of the input power of converter chain 2 to corresponding dissipating elements.

Controllable switch S22 also comprises three switches to couple the three dissipating elements to the DC-link. As already mentioned, the DC-links of the individual converter chains are coupled via controllable switches; for example, the DC-link of converter chain 2 is coupled to the DC-link of converter chain 3 via switch S24, which is controlled by controller 4. Thus, the dissipating units of adjacent converter chains are coupled via controllable switches; e.g. dissipating unit 24 is coupled to dissipating unit 34 via controllable switches S22, S24 and S32. This enables controller 4 to route power to be dissipated e.g. from converter chain 2 to dissipating unit 34.

The same applies by analogy to the other converter chains.

Figure 3:
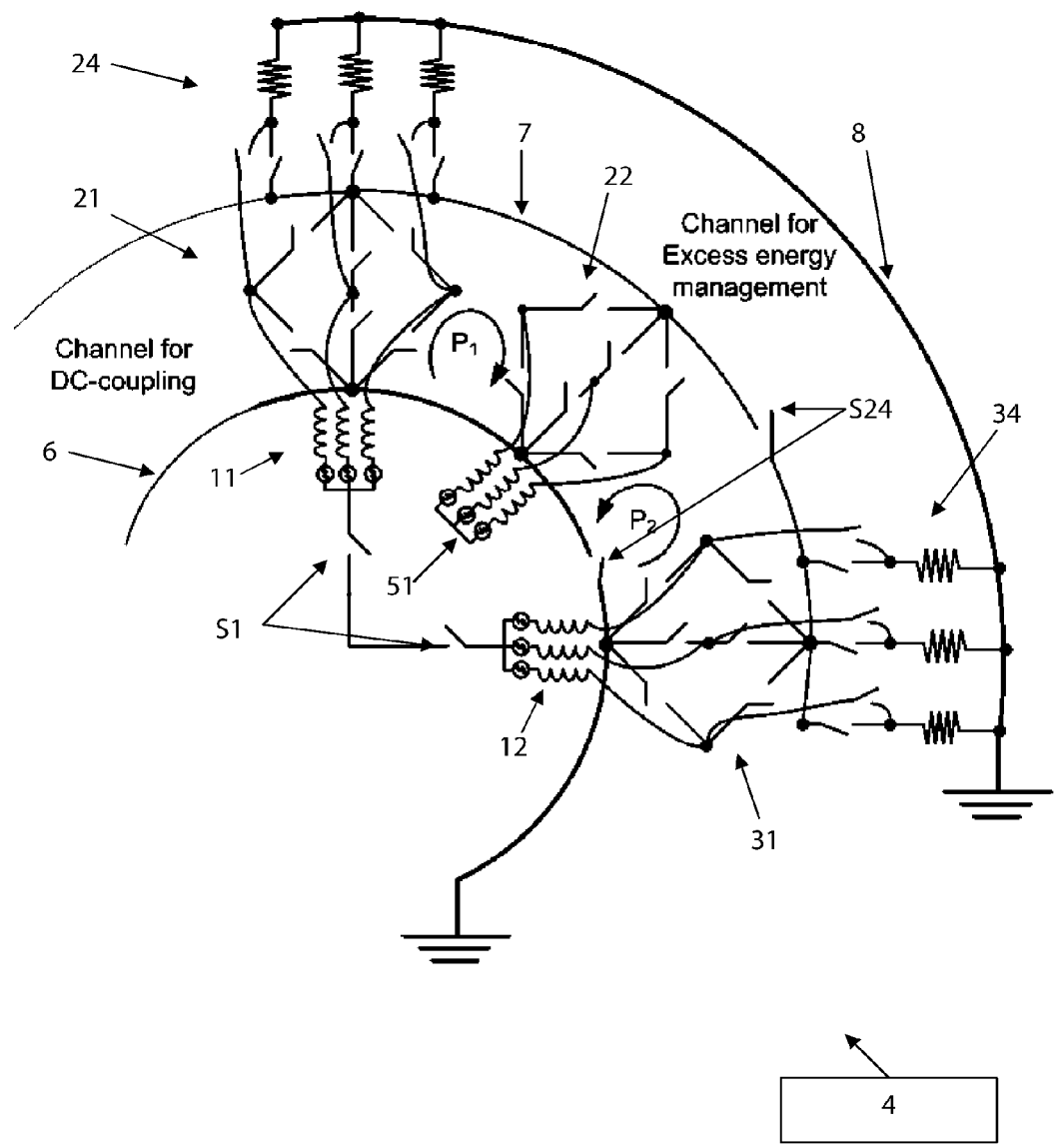
FIG. 3 illustrates an example of operation of the power conversion system of FIG. 2.

FIG. 3 shows an enlarged detail of FIG. 2 and illustrates an operation example of the system of FIG. 2. In particular, FIG. 3 illustrates an example of healthy operation under conditions where no power dissipation takes place; thus, power is routed only within the "channel" depicted in FIG. 3 as the inner circle ("Channel for DC-coupling").

FIG. 3 shows converter chain 2 and a part of converter chain 3. AC power from power source 11 is converted by AC/DC converter 21 into DC power, which is coupled via the DC-link 6, 7 to DC/AC converter 22. DC/AC converter 22 converts the DC power to AC power adapted according to requirements of load 51 and feeds it to load 51. This power transfer path is indicated by arrow P1.

In addition, power from power source 12 is received by converter chain 3 and converted by AC/DC converter 31 into DC power. However, instead of processing the DC power output further within converter chain 3 by means of AC/DC converter 31, the DC power is coupled via switch S24 (which is controlled by controller 4 to establish a connection, not shown) to the DC-link of converter chain 2 and input to DC/AC converter 22 to be converted into a suitable AC power and routed to load 51. This power transfer path is indicated by arrow P2.

Thus, two AC/DC converters couple power to a shared DC/AC converter. This configuration may be chosen e.g. in the event of an increased power demand of load 51, or if there is a failure of the load-side converter of converter chain 3.

Figure 4:
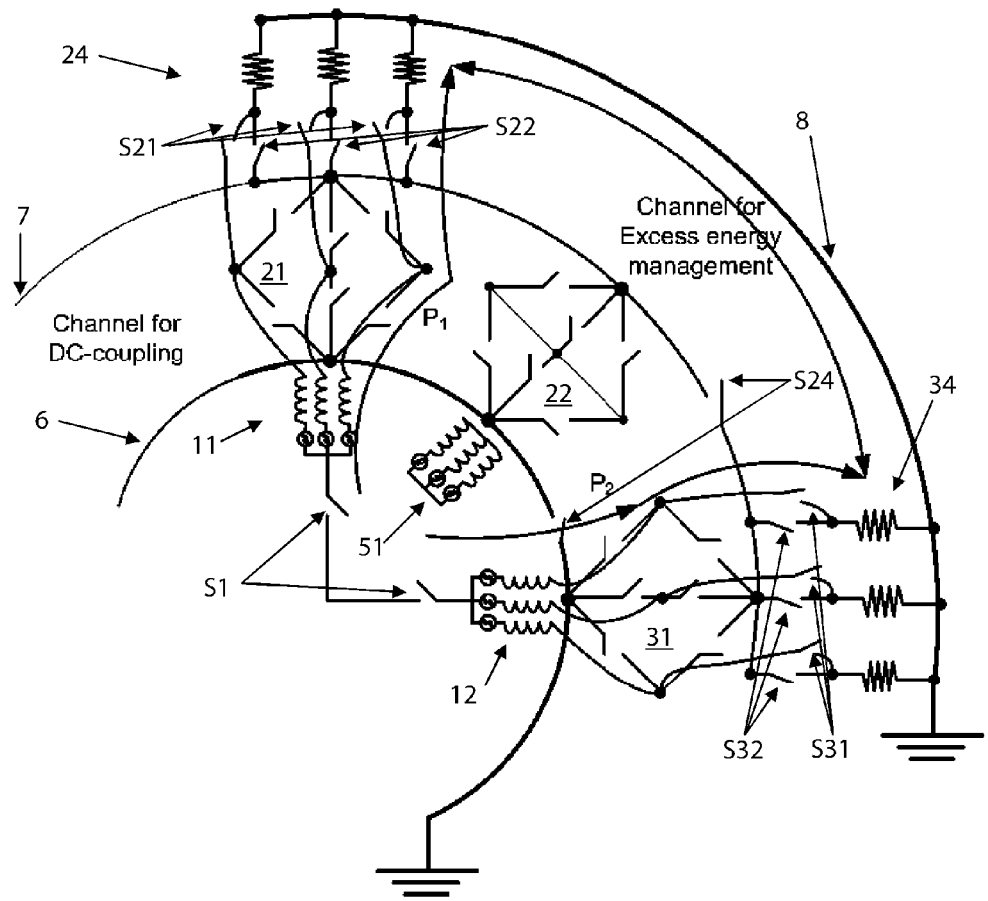
FIG. 4 illustrates another example of the operation of the power conversion system of FIG. 2.

FIG. 4 also shows an enlarged detail of FIG. 2 and illustrates another operation example of the system of FIG. 2. In particular, FIG. 4 illustrates an example of operation in a situation when a load fault event or a load-side converter fault event occurs. Since power dissipation takes place, power is also routed to the "channel" depicted in FIG. 4 as the outer circle ("Channel for Excess energy management").

FIG. 4 depicts both a load fault event and a load-side converter fault event. However, the following would also apply to the depicted configuration if only a load fault event or only a load-side converter fault event occurred.

Both the load fault event and the load-side converter fault event have the consequence that no more power is routed to DC/AC converter 22 and load 51. However, power sources 11 and 12 still produce power, which cannot be handled properly anymore by converters 21, 22 and 31, 32. It is assumed that channeling the power produced by power sources 11 and 12 to another load-side converter and load is not an option.

Controller 4, which constantly monitors the DC-link voltage, the load voltage and other required parameters, detects the fault events and the presence of power to be dissipated in converter chains 2 and 3. Furthermore, controller 4 detects or is informed that both associated dissipating units 24 and 34 are healthy and available for power dissipation. Thus, controller 4 controls switch S22 to close in order to route the power to be dissipated from the DC-link of converter chain 2 to dissipating unit 24 (cp. arrow P1), and switch S32 to close in order to route the power to be dissipated from the DC-link of converter chain 3 to dissipating unit 34 (cp. arrow P2).

Controller 4 further evaluates whether the power to be dissipated should be distributed to more than one dissipating unit. For this, controller 4 may consider in particular the amount of power to be dissipated or the—predicted or measured—duration of the fault event(s). In the present case, controller 4 may in addition decide to distribute the power to be dissipated to a plurality of dissipating units, e.g. in the event that power sources 11 and 12 produce considerably different amounts of power. If controller 4 decided to distribute the power to be dissipated to more than one dissipating unit, controller 4 would control switch S24 to close, thus routing power from both power sources 11 and 12 to both dissipating units 24 and 34.

Load fault events, as e.g. low voltage events, are usually rather short. Also, converter components may recover after a fault event, e.g. when they were overheated. Thus, controller 4 will continue to monitor the above parameters constantly or at predetermined time intervals to detect the end of a fault event.

As soon as the controller 4 detects the end of a fault event, it may in one implementation example stop power dissipation and resume normal operation by controlling switches S22 and S32 to interrupt the connections to the dissipating units.

Figure 5:
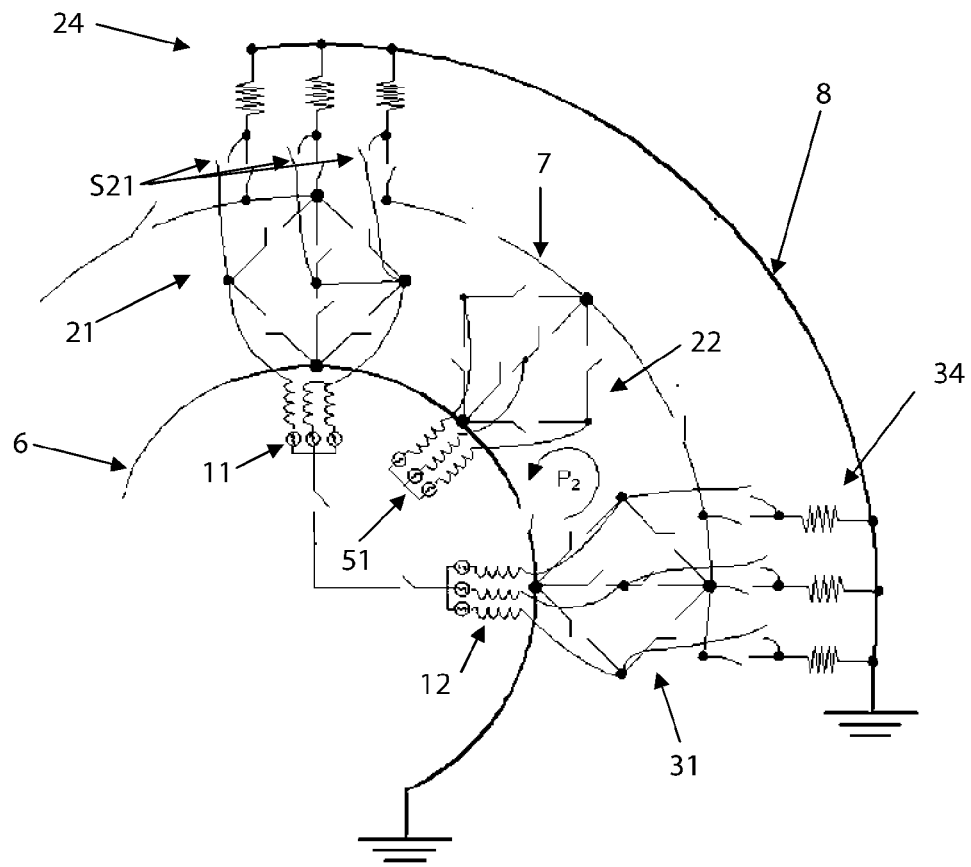
FIG. 5 illustrates a further example of the operation of the power conversion system of FIG. 2.
Figure 5:
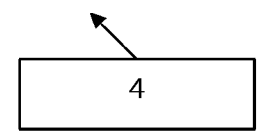

FIG. 5 also shows an enlarged detail of FIG. 2 and illustrates another operation example of the system of FIG. 2. In particular, FIG. 5 illustrates an example of operation in a situation when a source fault event (here a two-phase short circuit of power source 11) occurs. Since power dissipation takes place, power is also routed to the "channel" depicted in FIG. 5 as the outer circle ("Channel for Excess energy management").

Upon detection of the source fault event or the corresponding presence of power to be dissipated in converter chain 2, the controller 4 will control switch S21 to route the input power of converter chain 2 from the single intact phase of power source 11 to one of the dissipating elements of dissipating unit 24 and cause dissipation in order to maintain the mechanical balance of the generator.

In addition, the controller 4 may provide for isolation of the DC-link from faulty power source 11. During the fault event, controller 4 may thus continue to route power from power source 12 to load 51 (cp. FIG. 3). In particular, power may be transferred from power source 12 via source-side converter 31 of converter chain 3 and load-side converter 22 of converter chain 2 to load 51 by closing selectively controllable switch S24.

As explained with regard to FIG. 2, the generator segments representing the power sources 11-14 are arranged in symmetrical pairs. Thus, since power source 11 and the corresponding power transfer path are basically shut down, the controller 4 may shut down the other generator segment of the symmetrical pair, namely power source 13, and the corresponding converter chain in order to avoid mechanical imbalance.

Figure 6:
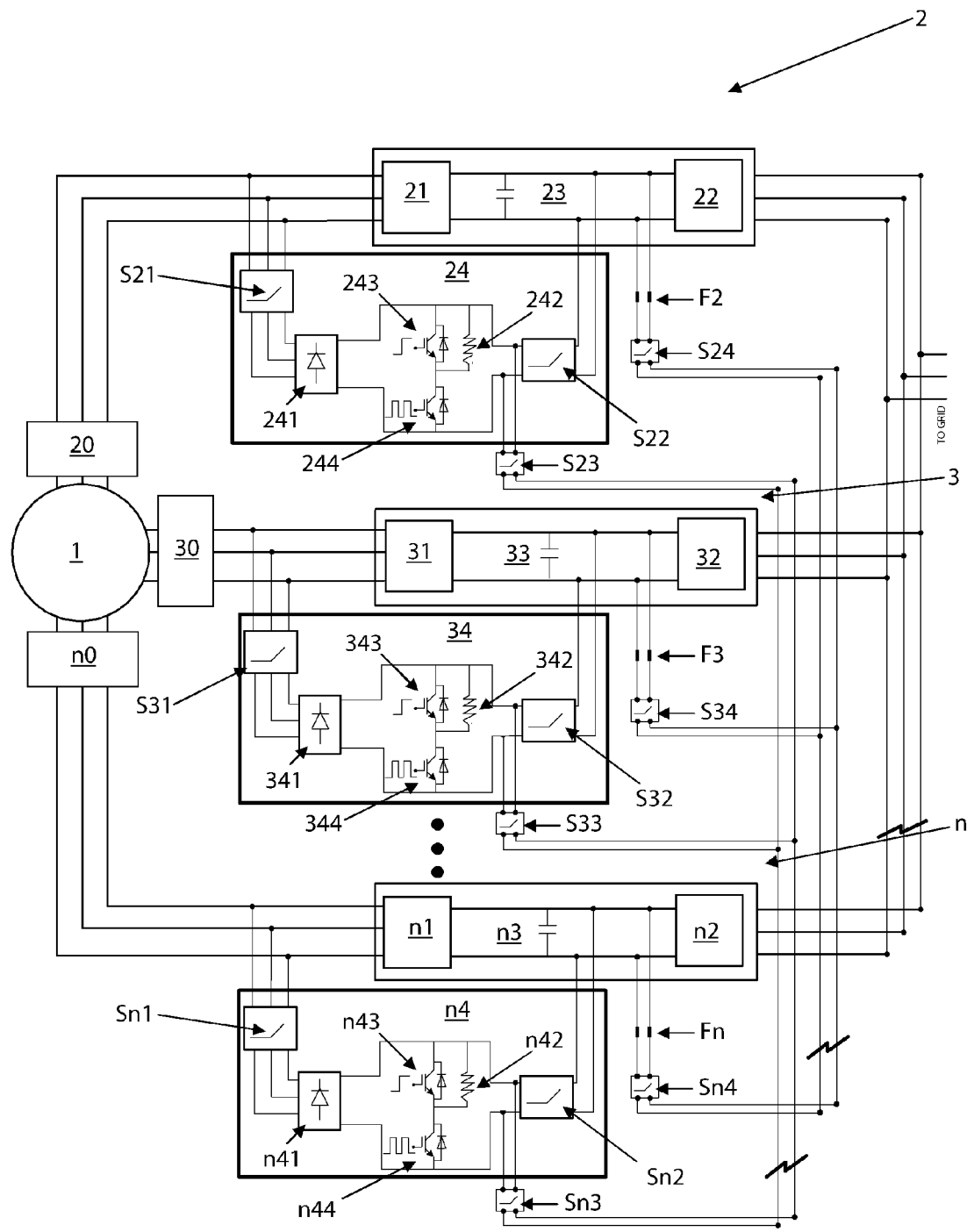
FIG. 6 shows a schematic illustration of another example of the power conversion system.

FIG. 6 shows a schematic illustration of another example of the power conversion system. The power conversion system of this example couples a wind turbine generator 1, which supplies n−1 AC power outputs 20-$n0$ and thus acts as n−1 power sources, to the mains power supply or grid (not shown). Furthermore, the power conversion system comprises converter chains 2-$n$, wherein each converter chain comprises a source-side AC/DC converter 21, . . . , n1, a DC-link 23, . . . , n3, a load-side DC/AC converter 22, . . . , n2 and an associated dissipating unit 24, . . . , n4.

The DC-links 23-$n3$ of the converter chains are coupled via controllable switches S24-Sn4 in a star configuration (or parallel) to a common point. Connecting the DC-links of the individual converter chains by controlling switches S24-Sn4 accordingly during operation will provide for a balanced DC-link voltage. In a different example, the DC-links of the converter chains may be coupled in series via controllable switches, or via a ring line, so that DC-link n3 of converter chain n may be coupled to DC-link 23 of converter chain 2 via a controllable switch. As shown, switches S24-Sn4 are complemented by fuses F2-Fn. The arrangement and number of fuses will be different for different circuits. Alternatively, single circuit breaker switches may be used.

Each dissipating unit 24, . . . , n4 is coupled via a controllable switch S21, . . . , Sn1 to its associated converter chain at the input of the converter chain on the source side of AC/DC converter 21, . . . , n1. Thus, the (AC) input power provided to the converter chain may be routed to the associated dissipating unit by controlling switch S21, . . . , Sn1 accordingly. In an alternative example, the switches S21, . . . , Sn1 may be arranged on the DC side of the corresponding AC/DC converter 241, . . . , n41.

In addition, each dissipating unit 24, . . . , n4 is coupled via a controllable switch S22, . . . , Sn2 to its associated converter chain across the DC-link 23, . . . , n3. Thus, power in the respective DC-links may be routed to the dissipating unit 24, . . . , n4 by controlling switch S22, . . . , Sn2 accordingly. Generally speaking, if there are any faults in the generator, generator connecting cables, AC/DC converter or any other component module on the source side of the DC-link, the AC input power to the converter chain is the power to be dissipated, and controller 4 (not shown in FIG. 6) will route the AC input power to the dissipating unit 24, . . . , n4 by controlling switch S21, . . . , Sn1 accordingly. During any faults of the grid (e.g. low voltage, high voltage, zero voltage) or any component faults on the load side of the DC-link, the power in the DC-link is the power to be dissipated, and controller 4 will route the power in the DC-link to the dissipating unit 24, . . . , n4 by controlling switch S22, . . . , Sn2.

The dissipating units are coupled in a star configuration via controllable switches S23-Sn3. This star configuration enhances fail-safety of the system, since each dissipating unit 24, . . . , n4 can be selectively connected and disconnected to a common connection point by means of controllable switch S23, . . . , Sn3. In particular, the star configuration ensures that power from each dissipating unit may be routed to any other dissipating unit by closing the corresponding switches without involving spatially interjacent dissipating units. To further enhance fail safety, the switches S23-Sn3 coupling the dissipating units 24-n4 to the common point may be configured as redundant parallel switches in one example. Thus, if one of the parallel switches fails, the other may still connect the dissipating unit to one or more of the other dissipating units.

In another example, the star configuration may be replaced by a bus bar to which the individual dissipating units 24-n4 are coupled via the controllable switches. In a yet different example, the dissipating units of the converter chains may be coupled via lines interrupted by controllable switches, e.g. via a ring line, so that dissipating unit n4 of converter chain n may be coupled to dissipating unit 24 of converter chain 2 via a controllable switch.

Additionally, dissipating units 24-n4 are coupled indirectly via controllable switches S22-Sn2 and the DC-links 23-n3 of their associated converter chains, which in turn are coupled to the DC-links 23-n3 of the other converter chains via switches S24-Sn4.

Each dissipating unit 24, . . . , n4 comprises an AC/DC converter 241, . . . , n41, e.g. a three-phase diode bridge, for rectifying the AC power provided at the input of the associated converter chain 2, . . . , n. A resistor 242, . . . , n42 is used to dissipate power which is routed to the dissipating unit 24, . . . , n4 either via switch S21, . . . , Sn1 or via switch S22, . . . , Sn2. Switches 243, . . . , n43 are normally kept in blocked state and switches 244, . . . , n44 receive PWM control signals from controller 4 to control power dissipation by the resistor 242, . . . , n42. Switches 243 and 244 may be IGBTs, breakers, thyristors or any other switch devices. In another example, only one controllable switch is arranged to provide for control of power dissipation by a dissipating element 242, . . . , n42, or a plurality of controllable switches are used.

Thus, power dissipation of power present in the DC-link will in this example start only if controller 4 controls switches 244, . . . , n44 of the dissipating unit accordingly. Therefore, DC-link power from a converter chain may be routed to other dissipating units than its associated dissipating unit via the associated dissipating unit and switches S23, . . . , Sn3 without causing dissipation in the associated dissipating unit.

The power conversion system may include additional components, even though they are not shown in FIG. 6. This may, for example, include grid chokes, grid filters, breakers, transformers or other components.

Operation of the power conversion system of FIG. 6 will now be described with regard to examples of fault events.

At first, it is assumed that AC/DC converter 21 is faulty. Shortly afterwards, a load fault event occurs, namely a low voltage.

Since the controller 4 (not shown in FIG. 6) constantly monitors the DC-link voltage of the converter chains 2-n and the load voltage, it is able to detect these fault events. In response to detecting the drop-out of AC/DC converter 21, controller 4 determines to which dissipating unit or units 24-n4 the power to be dissipated is to be routed. In the present case, associated dissipating unit 24 is available. None of the conditions under which power to be dissipated would be distributed to more than one dissipating unit applies. Thus, the controller 4 controls switch S21 to close and thus routes the power to be dissipated (i.e. here the input power of the converter chain 2) to the associated dissipating unit 24. Furthermore, the controller 4 outputs a PWM signal to switch 244 to start and control the dissipation of the power to be dissipated by resistor 242.

In response to the detection of the fault event of the common load shortly afterwards, controller 4 would normally activate all dissipating units 24-n4 to dissipate the power to be dissipated, i.e. here the residual power present in the DC-links 23-n3 of their respective associated converter chains 2-n due to the load fault. However, dissipating unit 24 is already operating to dissipate power due to the converter fault event. Thus, controller 4 will distribute the power present in the DC-link 23 of converter chain 2 to the remaining dissipating units by controlling switch S32 as well as switches S33-Sn3 and will close switches S24-Sn4, if they are not already closed in order to balance the DC-link voltage during operation. In addition, the controller 4 will control switches 344-n44 to cause power dissipation by resistors 342-n42. As a result, the power present in the DC-links 23-n3 of converter chains 2-n will be distributed via dissipating unit 34 and switches S33-Sn3 to all dissipating units 34-n4 except dissipating unit 24.

In another example, the controller may control switches S32-Sn2 to close (instead of closing only switch S32 and switches S33-Sn3) in order to distribute the DC-link power to the dissipating units 34-n4; since the switches S24-Sn4 are closed, the dissipating units 34-n4 will still be coupled, so that power to be dissipated from all DC-links 23-n3 will still be routed to dissipating units 34-n4.

Normally, a low voltage will last only a few milliseconds, e.g. 250 ms. When the controller 4 detects the end of the load fault event, it will resume normal operation for converter chains 3-n by routing power from the wind turbine generator 1 through converter chains 3-n to the load by opening switch S32 and switches S33-Sn3. In addition, the PWM signals for switches 344-n44 may be inhibited. As a consequence, the system will operate in a partial power mode (because converter chain 2 is still deactivated).

In the event that the fault in AC/DC converter 21 is not resolved after a predetermined time interval, controller 4 will distribute the input power of converter chain 2, which is here the power to be dissipated, to all dissipating units 24-n4 by closing switches S23-Sn3 (switch S21 is already closed to route the input power to dissipating unit 24). This may reduce wear and prolong the life cycle of dissipating unit 24.

Figure 7:
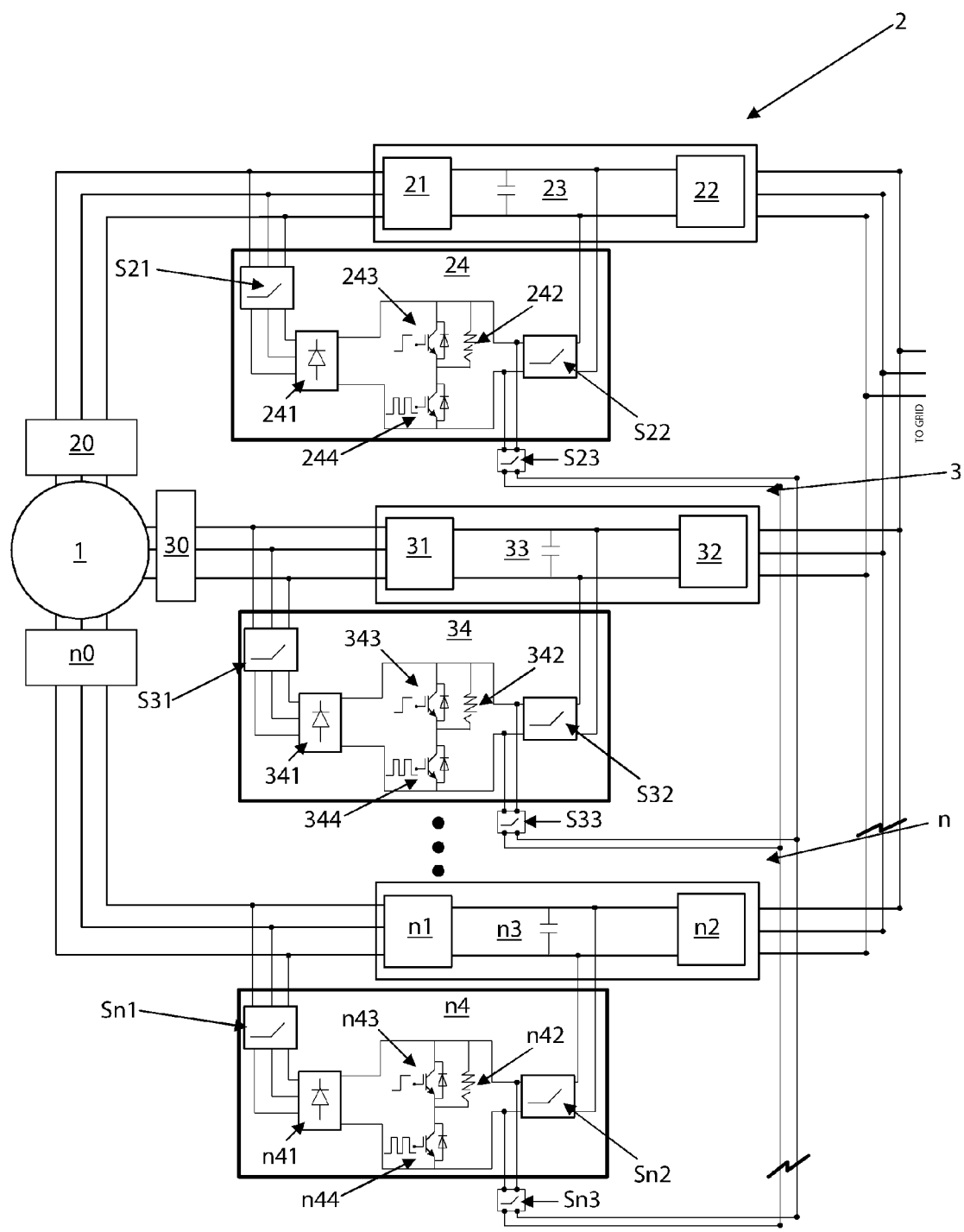
FIG. 7 shows a schematic illustration of a further example of the power conversion system.

FIG. 7 is a schematic illustration of another example of the power conversion system, which is identical to the power conversion system of FIG. 6 with the exception that the star configuration coupling the DC-links via switches S24-Sn4 is omitted. If required, the DC-links may be coupled via controllable switches S22, . . . , Sn2 and S23, . . . , Sn3.

Figure 8:
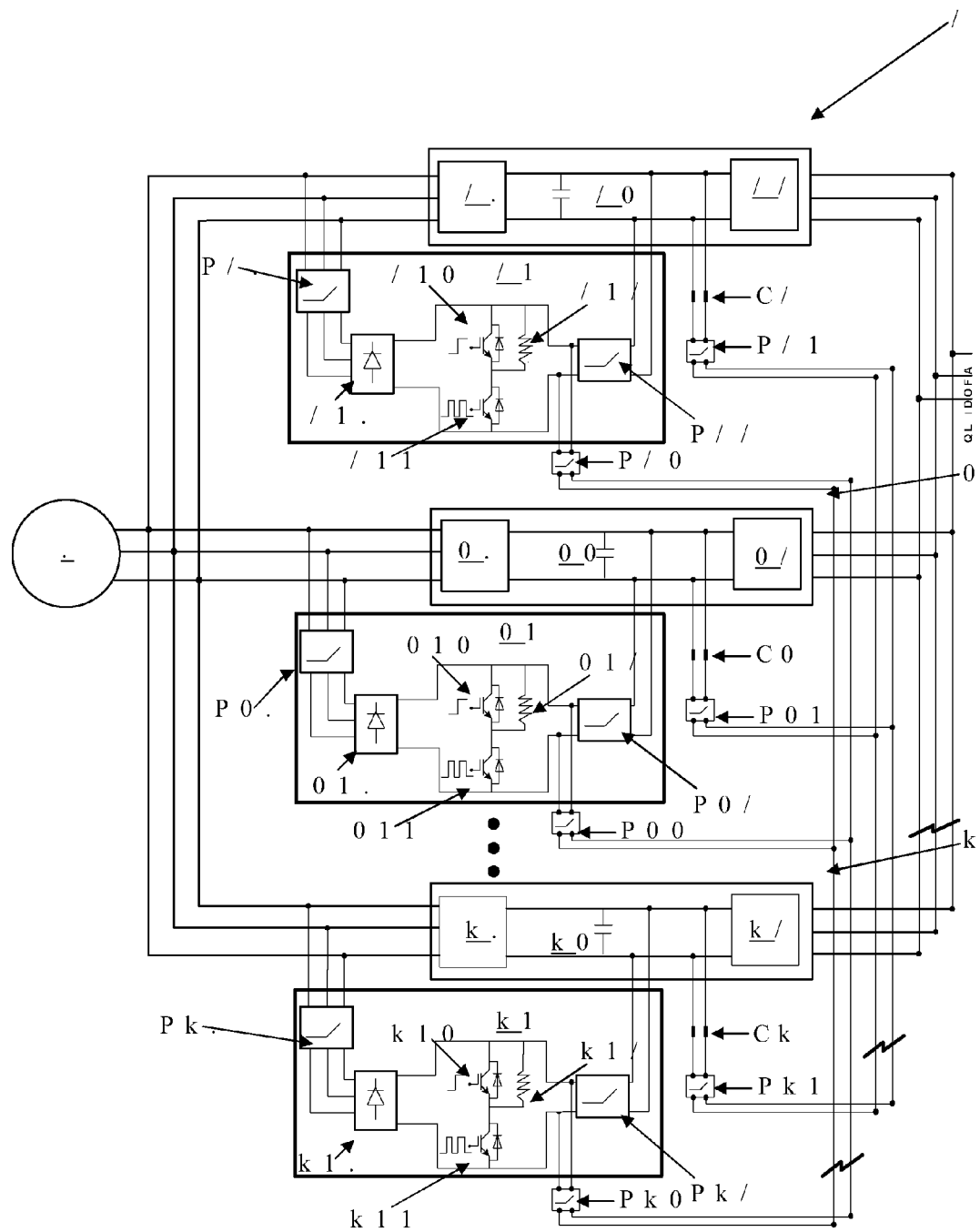
FIG. 8 shows a schematic illustration of another example of the power conversion system.

FIG. 8 is a schematic illustration of a further example of the power conversion system, which is identical to the power conversion system of FIG. 6 with the exception of the configuration of generator 1, which provides only one AC power output. The converter chains 2-n are coupled in parallel to this AC power output. In this example, a small choke (not shown) may be added in series with the converter chains to avoid current circulation.

Figure 9:
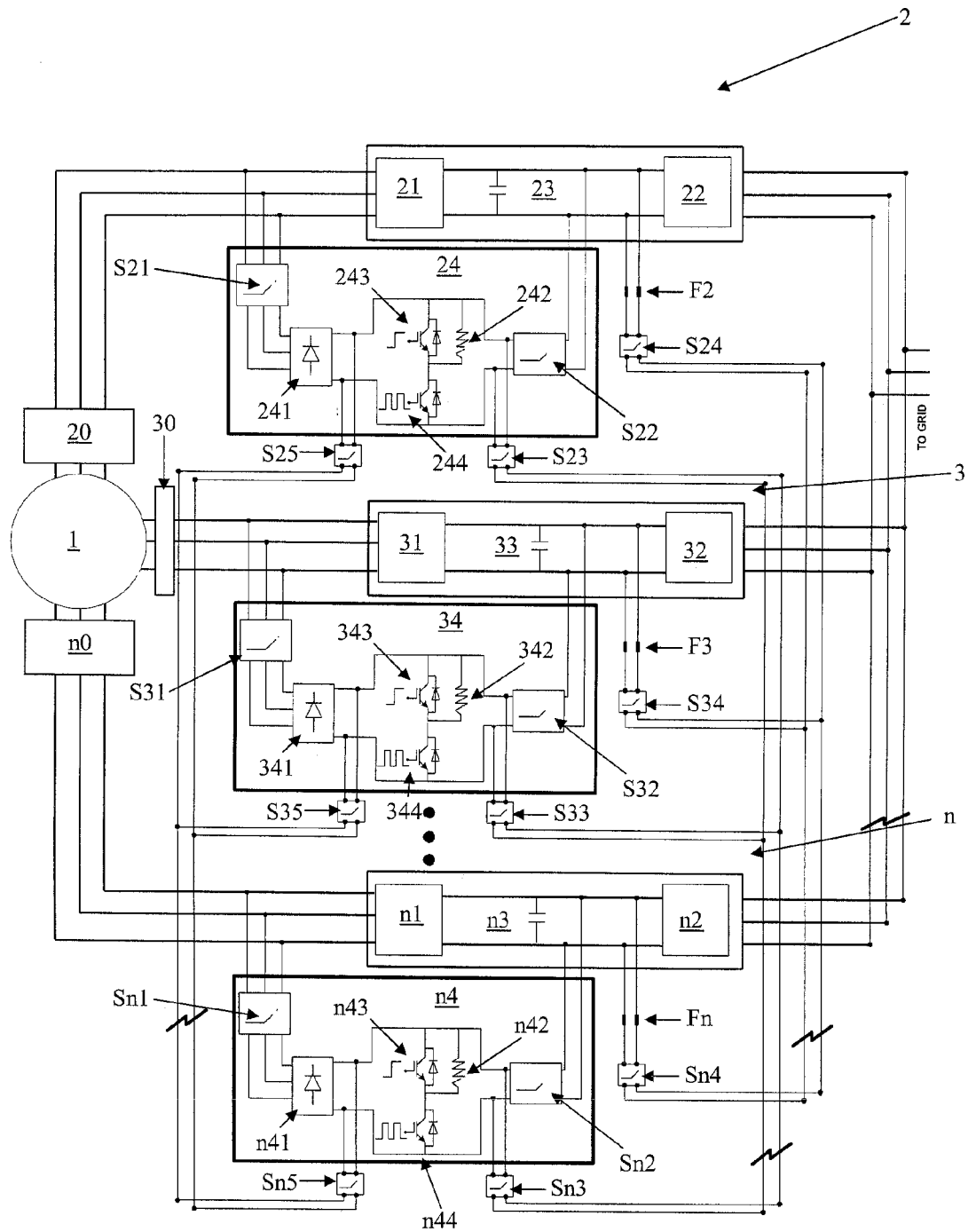
FIG. 9 shows a schematic illustration of yet another example of the power conversion system.

FIG. 9 too is a schematic illustration of a further example of the power conversion system, which is identical to the power conversion system of FIG. 6 with the exception that the dissipating units 24-n4 are additionally coupled in another star configuration via switches S25-Sn5. This second connection provides extra redundancy.

Figure 10:
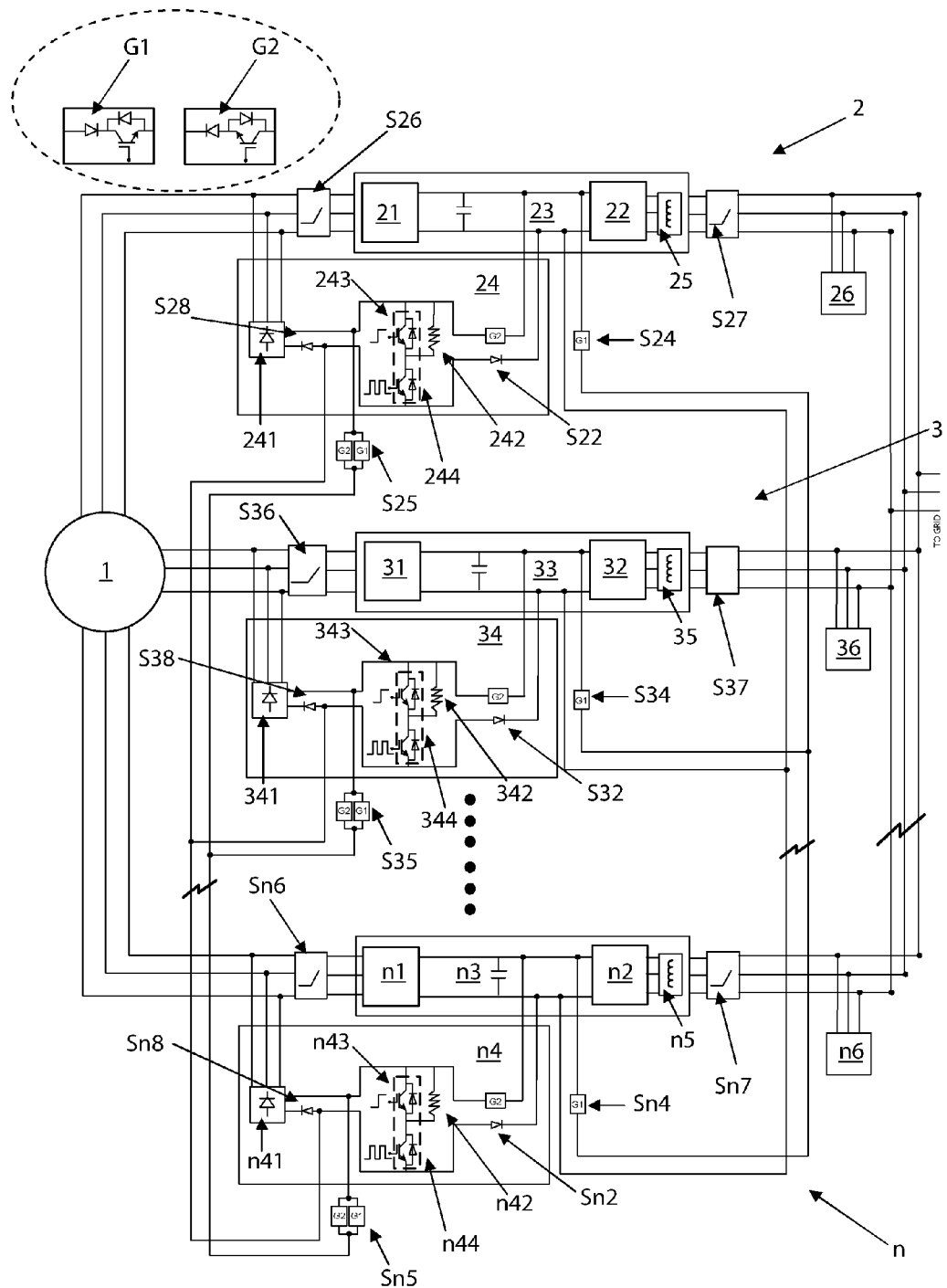
FIG. 10 shows a schematic illustration of yet another example of the power conversion system.

FIG. 10 shows a schematic illustration of another example of the power conversion system, which is similar to the power conversion system of FIG. 6, but minimises the number of switches used.

In particular, switches S21-Sn1 of FIG. 6 are replaced by diodes S28-Sn8, which do not provide a switching function, but merely define the direction of a current flow. In addition, each converter chain 2, ..., n comprises a controllable switch S26, ..., Sn6 on the source-side of AC/DC converter 21, ..., n1 and a controllable switch S27, ..., Sn7 on the load-side of DC/AC converter 22, ..., n2 for isolating the corresponding AC/DC converter, DC-link and DC/AC converter from the wind turbine generator 1 and the load. In the event of a failure e.g. of AC/DC converter 21, the controller 4 may control switches S26 and S27 to open and thus isolate AC/DC converter 21, DC-link 23 and DC/AC converter 22 from the respective power source and the load.

In the example of FIG. 10, the dissipating units 24-n4 are coupled via switches S25-Sn5 in a star configuration to a common point. The switches S25-Sn5 coupling the dissipating units 24-n4 to the star configuration are configured as parallel controllable sub-switches G1 and G2. If, as shown in FIG. 10, two (or more) lines are used for the coupling of (e.g.) the dissipating units 24-n4 (wherein e.g. one line is at ground potential), it may be sufficient for making and breaking a connection to provide a controllable switch (here the parallel sub-switches) in one of the lines. In one example, the parallel sub-switches enable the control of the direction of current flow. Configuration examples of a sub-switch G1 and a sub-switch G2 are shown in the upper left corner of FIG. 10. For example, an IGBT (or MOSFET or GTO) with an anti-parallel diode may be serially coupled to an additional diode to define a direction of current flow, wherein G1 and G2 as shown define reversed current flow directions. Other configuration may be used. As shown, the sub-switch G1 is coupled to selectively enable a current flow from a dissipating unit 24, ..., n4 in direction to the common connection point, and the sub-switch G2 is coupled to selectively enable a current flow from the common connection point to a dissipating unit 24, ..., n4.

Thus, in the event that there is a requirement of coupling healthy dissipating units while not dissipating power in faulty dissipating units, the sub-switches G1 of the faulty dissipating units and the sub-switches G2 of the healthy dissipating units may be turned on. For example if dissipating element 242 of dissipating unit 24 is faulty, and power from converter chain 2 needs to be dissipated, sub-switch G1 of S25 and sub-switches G2 of S35 and Sn5 are turned on, thus routing the power to be dissipated to dissipating units 34 and n4.

In the depicted implementation, the switches S24-Sn4 coupling DC-links 23-n3 may also comprise a switch G1 of the configuration described above, for example only in one of two or more lines used for the coupling of the DC-links 23-n3. For example, the switches G1 may be coupled to enable a current flow in direction from the DC-links 23-n3 to the common connection point. In another example, the switches S24-Sn4 may include parallel sub-switches G1 and G2 to enable the control of the current flow in both directions, as described with regard to the switches S25-Sn5.

Similarly, the switches S22-Sn2 coupling the dissipating units 24, ..., n4 to the DC-links 23, ..., n3 may comprise a switch G2 arranged in one of the lines, which may be coupled to enable a current flow in direction from the DC-links 23, ..., n3 to the dissipating units 24, ..., n4. In a different example, the switches S22-Sn2 may include parallel sub-switches G1 and G2 to enable the control of the current flow in both directions, as described with regard to the switches S25-Sn5. In one example, switches S22-Sn2 may be replaced by diodes. This example assumes that the DC-link voltage is sufficiently low.

If required, the G1 or G2 switches may be complemented by diodes, e.g. in a line not interrupted by the G1 or G2 switches, as shown for the switches S22-Sn2.

In a different implementation example, the connection of the DC-links via switches S24-Sn4 is omitted, so that the DC-links are decoupled.

Finally, converter chains 2-n comprise chokes 25-n5. Using separate chokes 25-n5 provides for reducing cross current flow. Converter chains 2-n also comprise grid filters 26-n6, which may additionally serve to form the output voltage of the converter chains by filtering out the switching harmonics produced by the power converter.

The controller 4 is able to route power in the systems of FIGS. 7 to 10 according to the general principle described with regard to FIG. 6 with some adaptations to take account of the different implementations.

Figure 11:
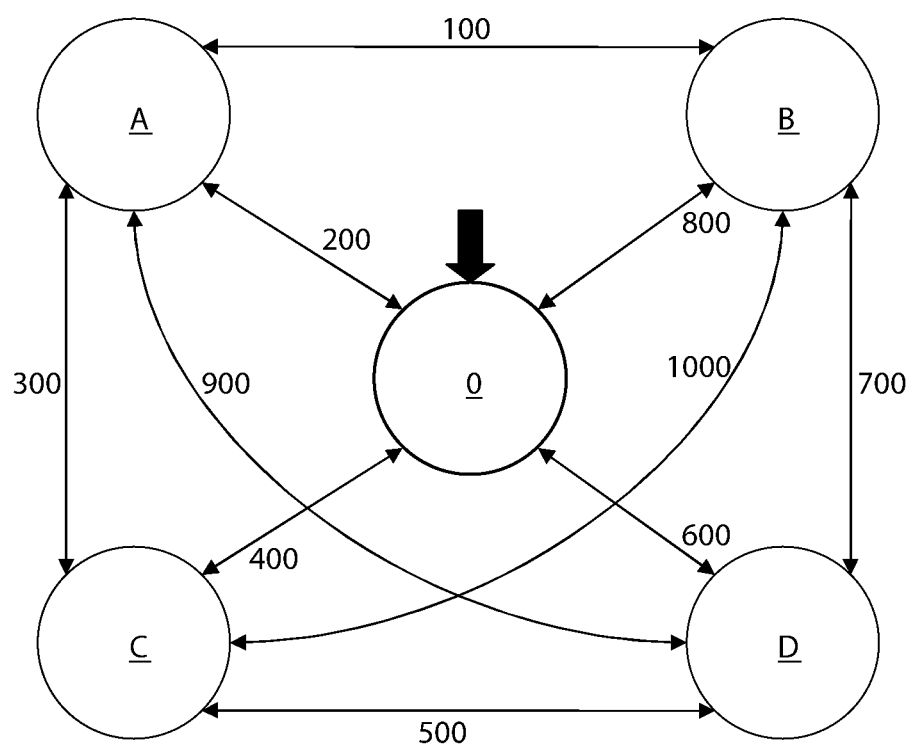
FIG. 11 shows a state diagram schematically illustrating an example of the method of converting power.

FIG. 11 shows a state diagram schematically illustrating an example of the method of converting power considering one, predetermined, chain of the plurality of converter chains of a power conversion system. In particular, FIG. 11 concerns a power conversion system with a total of two converter chains with associated dissipating units and illustrates the states one of them can take. Both dissipating units of this power conversion system are coupled via controllable switches to their associated converter chains to route either the input power of the converter chain or the DC-link power of the converter chain to the corresponding dissipating unit. The method steps described below are performed by a controller.

When no power to be dissipated is detected in the predetermined converter chain (which usually means that the converter chain operates normally), the predetermined converter chain is in state 0. In this state, power from the at least one power source is routed to the load via the predetermined converter chain. That is, when both converter chains are in the state 0, the power converter system is healthy, and power is routed from the at least one power source to the at least one load via the two converter chains. State A is the start state (i.e. the state in which the predetermined converter chain is when operation of the power conversion system is started), as indicated by the thick arrow.

While the predetermined converter chain is in the state 0 (and also if it is in one of the other states A-D), parameters are monitored which are indicative of possible fault events concerning the predetermined converter chain and/or the presence of power to be dissipated in the predetermined converter chain. For example, the parameters may be monitored constantly or at predetermined time intervals, e.g. every few milliseconds. The monitored parameters may comprise, but are not restricted to, one or more of the following: DC-link current of the predetermined converter chain; DC-link voltage of the predetermined converter chain; load voltage; load frequency; output power from power source; output current from power source; and output voltage from power source.

Based on the monitored parameters, a fault event concerning the predetermined converter chain may be detected and identified in one example. Based on the detected fault event or independently thereon, the presence of power to be dissipated in the predetermined converter chain may be detected. In response to the detection of the presence of power to be dissipated, the predetermined converter chain is transitioned to one of the states A-D.

Transition 200 from state 0 to state A will be considered to be fulfilled in the present example if power to be dissipated is detected in the predetermined converter chain, the associated dissipating unit is available for power dissipation and the amount of power to be dissipated is not too large. A dissipating unit may in this example be available if it is not unavailable due to failure—e.g. because the dissipation unit is damaged—, and if it is not restrictedly available because it is already being used to dissipate power from the other converter chain. Furthermore, a dissipating unit may be restrictedly available because it is dissipating power from the predetermined converter chain owing to an earlier fault event; however, this situation obviously cannot occur for a transition from state 0, because the predetermined converter chain will only be in state 0 as long as no power to be dissipated is detected in the predetermined converter chain. To determine whether the amount of power to be dissipated is too large, the detected power may be compared to a first predetermined power threshold (e.g. in the range of a few watts). Alternatively, the fault event may be identified, and the expected amount of power to be dissipated may be derived from the identified fault event. Then, the expected power may be compared to the first threshold.

State A will be transitioned back to state 0 if power to be dissipated is no longer detected in the predetermined converter chain.

In state A, power to be dissipated—which may be input power or DC-link power—is routed from the predetermined converter chain to its associated dissipating unit, and dissipation of the power to be dissipated is caused only in the associated dissipating unit. This may in one example involve controlling corresponding switches coupling the associated dissipating unit to the converter chain to close, and controlling the associated dissipating unit to initiate dissipation. In state A, no power is routed from the predetermined converter chain to the other dissipating unit. Thus, one or more switches which are used to couple the associated dissipating unit to the other dissipating unit are controlled to be open and provide no connection.

Transition 800 from state 0 to state B will be determined to be fulfilled in the present example if the presence of power to be dissipated is detected and the associated dissipating unit is unavailable or restrictedly available for power dissipation, while the other dissipating unit is available. In some examples (coordinated with transition 400), it is in addition required that the amount of power to be dissipated is not too large. Alternatively, transition 800 will be determined to be fulfilled if power to be dissipated is detected in the predetermined converter chain, the associated dissipating unit is unavailable e.g. due to failure and the other dissipating unit not unavailable e.g. due to failure. That is, in the event that the associated dissipating unit is damaged, state B will be entered even if the other dissipating unit is considered restrictedly available, e.g. because it is already dissipating power caused by another fault event, and regardless of the amount of power to be dissipated.

State B will be transitioned back to state 0 if power to be dissipated is no longer detected in the predetermined converter chain.

In state B, power to be dissipated is routed from the predetermined converter chain to the other dissipating unit which is not its associated dissipating unit, and dissipation of that power to be dissipated is only caused in the other dissipating unit. In one example this may involve controlling corresponding switches coupling the associated dissipating unit to the converter chain and switches coupling the associated dissipating unit to the other dissipating unit to close, and controlling the other dissipating unit to initiate dissipation. No power from the predetermined converter chain is dissipated in its associated dissipating unit.

Transition 400 from state 0 to state C will be determined to be fulfilled in the present example if the presence of power to be dissipated is detected, the amount of power is too large to be dissipated in a single dissipating unit and none of the two dissipating units is unavailable due to failure. That is, state C will be entered even if one or both of the dissipating units are considered restrictedly available. In another example, state C will only be entered if either both dissipating units are available, or both dissipating units are restrictedly available (otherwise, state A or state B may be entered; transitions 200 and 800 then need to be adapted accordingly).

State C will be transitioned back to state 0 if power to be dissipated is no longer detected in the predetermined converter chain.

In state C, power to be dissipated is routed from the predetermined converter chain to its associated dissipating unit and to the other dissipating unit. This may involve controlling switches via which the corresponding dissipating units are coupled to be closed and provide connection, and both dissipating units to cause dissipation.

Transition 600 from state 0 to state D will be determined to be fulfilled in the present example if the presence of power to be dissipated is detected in the predetermined converter chain and none of the transitions 200, 400 and 800 is fulfilled. In particular, state D is entered from state 0 if both dissipating units are unavailable due to failure. In some examples, state D is only entered if the amount of power to be dissipated exceeds the first power threshold, i.e. is so large that it might damage the converter components etc., or if power to be dissipated has been present for a predetermined time interval. Until these conditions are met, the system may stay in state 0.

In state D, an emergency routine is started. This may involve e.g. shutting down the wind turbine in order to prevent the production of any further power which cannot be handled by the power conversion system.

Depending on the chosen emergency routine, in some examples state D may transition to state 0 if power to be dissipated is no longer detected in the predetermined converter chain.

Transition 100 from state A to state B will be determined to be fulfilled in the present example if power to be dissipated is still present in the predetermined converter chain, the associated dissipating unit becomes unavailable due to failure (for example because the dissipating unit overheats while dissipating power) and the other dissipating unit is not unavailable due to failure. Transition 300 from state A to state C will be determined to be fulfilled in the present example if power to be dissipated is still present in the predetermined converter chain, the other dissipating unit is available and power to be dissipated has been present in the predetermined converter chain for a predetermined time interval, or if power to be dissipated is still present in the predetermined converter chain, the other dissipating unit is not unavailable due to failure and the amount of power to be dissipated is too large, e.g. exceeds the first power threshold (e.g. because an additional fault event causes additional power to be dissipated to be present in the predetermined converter chain). The predetermined time interval may be chosen appropriately (e.g. in the range of a second) depending on the component configuration of the power conversion system. Transition 900 from state A to state D will be determined to be fulfilled in the present example if power to be dissipated is still present in the predetermined converter chain, the associated dissipating unit becomes unavailable due to failure and the other dissipating unit is also unavailable due to failure.

Transition 300 from state B to state A will be determined to be fulfilled in the present example if power to be dissipated is still present in the predetermined converter chain and the associated dissipating unit becomes available, for example if the associated dissipating unit was overheated and has cooled down, or if it has been dissipating power from the other converter chain as a result of a fault event which in the meantime has been overcome. Transition 1000 from state B to state C will be determined to be fulfilled in the present example if power to be dissipated is still present in the predetermined converter chain, the associated dissipating unit is available and power to be dissipated has been present in the predetermined converter chain for a period of time which is longer than the predetermined time interval, or alternatively if power to be dissipated is still present in the predetermined converter chain, the associated dissipating unit is not unavailable due to failure and the amount of power to be dissipated is too large, e.g. exceeds the first power threshold. Transition 700 from state B to state D will be determined to be fulfilled in the present example if power to be dissipated is still present in the predetermined converter chain, the other dissipating unit has become unavailable due to failure and the associated dissipating unit is also unavailable due to failure.

Transition 300 from state C to state A will be determined to be fulfilled in the present example if power to be dissipated is still present in the predetermined converter chain and the amount of power to be dissipated is below a predetermined second power threshold, or if power to be dissipated is still present in the predetermined converter chain and the other dissipating unit has become unavailable due to failure. The second predetermined threshold is normally lower than the first predetermined threshold. Transition 1000 from state C to state B will be determined to be fulfilled in the present example if power to be dissipated is still present in the predetermined converter chain and the associated dissipating unit has become unavailable due to failure. Transition 700 from state C to state D will be determined to be fulfilled in the present example if power to be dissipated is still present in the predetermined converter chain and both dissipating units have become unavailable due to failure.

Transition 900 from state D to state A will be determined to be fulfilled in the present example (it is assumed below that the chosen emergency routine allows a transition from state D) if power to be dissipated is still present in the predetermined converter chain, the associated dissipating unit is no longer unavailable due to failure and neither the amount of the power to be dissipated is larger than the first power threshold, nor the power to be dissipated has been present for a time longer than the predetermined time interval. Alternatively, transition 900 from state D to state A will be determined to be fulfilled if power to be dissipated is still present in the predetermined converter chain, the associated dissipating unit has become available or restrictedly available and the other dissipating unit is still unavailable due to failure. Transition 700 from state D to state B will be determined to be fulfilled in the present example if power to be dissipated is still present in the predetermined converter chain, the other dissipating unit has become available or restrictedly available and the associated dissipating unit is still unavailable. Transition 700 from state D to state C will be determined to be fulfilled in the present example if power to be dissipated is still present in the predetermined converter chain, both dissipating units are no longer unavailable due to failure and the amount of the power to be dissipated is larger than the first power threshold or the power to be dissipated has been present for a longer time than the predetermined time interval.

While embodiments of the invention have been particularly shown and described with reference to the drawings, is should be understood by those skilled in the art that various changes to the examples shown in the drawings in form and detail may be made without departing from the scope of the invention as defined in the appended claims. The scope of the invention is thus indicated by the appended claims.

The invention claimed is:

1. A power conversion system for converting electrical power from at least one power source, comprising
   a plurality of converter chains, each of which is configured to couple at least one power source to at least one load, wherein at least two of the converter chains each comprise respective dissipating unit, and wherein the at least two dissipating units are coupled via at least one switch; and
   a controller configured to control the at least one switch to route power to be dissipated from one of the converter chains to one or more of:
   the associated dissipating unit of said converter chain, and
   at least one of the other dissipating units,
   to cause corresponding dissipation of the routed power.

2. The system of claim 1, wherein the dissipating units are coupled via the at least one switch to a common connection point.

3. The system of claim 1, wherein each of the converter chains comprises a source-side AC/DC power converter and a load-side DC/AC power converter, wherein the power converters are coupled via DC-links.

4. The system of claim 3, wherein the respective DC-links of each of the converter chains are coupled via at least one switch controllable by the controller.

5. The system of claim 4, wherein each of the converter chains comprise switches controllable by the controller to isolate the respective source-side power converters and the load-side power converters.

6. The system of claim 3, wherein each of the dissipating units is coupled to the DC-links of the respective converter chains.

7. The system of claim 1, wherein the at least two dissipating units are each coupled to the inputs of the respective converter chains to enable the routing of input power received by the converter chains to their associated dissipating units.

8. The system of claim 7, wherein each of the at least two dissipating units comprises a number of dissipating elements equal to the number of phases of the input power, and wherein phase lines carrying the phases of the input power are coupled via switches to the dissipating elements.

9. A method of converting electrical power, comprising:
   routing the electrical power from at least one power source to at least one load via a plurality of converter chains, wherein each converter chain is configured to couple at least one power source to at least one load, wherein at least two of the converter chains each comprise respective dissipating unit, and wherein the at least two dissipating units are coupled via at least one switch; and
   routing power to be dissipated from one of the converter chains to one or more of:
   the associated dissipating unit of said converter chain, and
   at least one of the other dissipating units,
   by controlling the at least one switch accordingly, to cause corresponding dissipation of the routed power.

10. The method of claim 9, further comprising:
    monitoring parameters indicative of the presence of power to be dissipated in one or more of the converter chains.

11. The method of claim 10, further comprising:
    detecting the presence of power to be dissipated in one or more of the converter chains.

12. The method of claim 10, further comprising:
    detecting one or more of the following: a fault event of a source-side component of a converter chain, a fault event of a load-side component of a converter chain, a fault event of the at least one power source, and a fault event of the load.

13. The method of claim 12, further comprising:

routing input power received by the converter chain, as power to be dissipated, to at least one of the dissipating units if the detected fault event is a fault event of a source-side component of a converter chain or a fault event of the at least one power source, and routing power present between the source-side components and the load side components of the converter chains, as power to be dissipated, to at least one of the dissipating units if the detected fault event is a fault event of a load-side component of a converter chain or a fault event of the load.

14. The method of claim 9, further comprising:

routing the power to be dissipated to more than one dissipating units if the amount of power to be dissipated exceeds a threshold or if a fault event lasts longer than a predetermined time interval.

15. The method of claim 9, further comprising:

detecting whether a dissipating unit is unavailable and routing power to be dissipated to one or more of the other dissipating units if the associated dissipating unit is unavailable.

\* \* \* \* \*